(12) United States Patent
Dozen

(10) Patent No.: US 11,347,458 B2
(45) Date of Patent: May 31, 2022

(54) ELECTRONIC DEVICE THAT CONTROLS HARDWARE, AND NON-TRANSITORY COMPUTER-READABLE RECORDING MEDIUM STORING HARDWARE CONTROL PROGRAM FOR ELECTRONIC DEVICE

(71) Applicant: KYOCERA Document Solutions Inc., Osaka (JP)

(72) Inventor: Kazuki Dozen, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 43 days.

(21) Appl. No.: 17/029,330

(22) Filed: Sep. 23, 2020

(65) Prior Publication Data

US 2021/0096787 A1  Apr. 1, 2021

(30) Foreign Application Priority Data

Sep. 27, 2019 (JP) .............................. JP2019-176654

(51) Int. Cl.
*G06F 3/12* (2006.01)
*G06F 9/54* (2006.01)
*G06F 9/48* (2006.01)

(52) U.S. Cl.
CPC ............ *G06F 3/126* (2013.01); *G06F 3/1268* (2013.01); *G06F 9/4881* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 2015/0350472 A1* | 12/2015 | Hirota | H04N 1/00962 358/1.13 |
| 2015/0373223 A1* | 12/2015 | Furushige | H04N 1/00973 358/1.13 |
| 2019/0253569 A1* | 8/2019 | Abe | H04N 1/00954 |
| 2019/0286390 A1* | 9/2019 | Kajikawa | H04N 1/0048 |
| 2019/0289148 A1* | 9/2019 | Utoh | H04N 1/00477 |
| 2019/0289159 A1* | 9/2019 | Kodama | H04N 1/0035 |
| 2021/0064387 A1* | 3/2021 | Chew | G06F 3/1204 |
| 2021/0281705 A1* | 9/2021 | Azakami | H04N 1/00344 |
| 2021/0342105 A1* | 11/2021 | Chew | G06F 3/1203 |
| 2021/0373829 A1* | 12/2021 | Martin | G06F 3/1212 |

FOREIGN PATENT DOCUMENTS

JP    2016-009927    1/2016

* cited by examiner

*Primary Examiner* — Henok Shiferaw
(74) *Attorney, Agent, or Firm* — Lex IP Meister, PLLC

(57) ABSTRACT

An image forming device, which is an electronic device, includes an AI processor that is hardware, an AI processor operating unit that operates the AI processor and an AI processor control service that controls the AI processor exclusively via an interface provided by the AI processor operating unit.

4 Claims, 10 Drawing Sheets

FIG. 7A

CONFIGURATION FILE
{ "PROCESS A" :
 { "SWITCHING UNIT" : "OBJECT" },
  "PROCESS B" :
 { "SWITCHING UNIT" : "PAGE" }
}

FIG. 7B

CONFIGURATION FILE
{ "PROCESS A" :
 { "SWITCHING UNIT" : "OBJECT" },
  "PROCESS B" :
 { "SWITCHING UNIT" : "OBJECT" }
}

FIG. 8A

EXECUTION ORDER
1. OPERATION REQUEST A    FIRST PAGE     FIRST OBJECT
2. OPERATION REQUEST B    FIRST PAGE     FIRST OBJECT
3. OPERATION REQUEST B    FIRST PAGE     SECOND OBJECT
4. OPERATION REQUEST A    SECOND PAGE    FIRST OBJECT
5. OPERATION REQUEST B    SECOND PAGE    FIRST OBJECT
6. OPERATION REQUEST B    SECOND PAGE    SECOND OBJECT

FIG. 8B

EXECUTION ORDER
1. OPERATION REQUEST A    FIRST PAGE     FIRST OBJECT
2. OPERATION REQUEST B    FIRST PAGE     FIRST OBJECT
3. OPERATION REQUEST A    SECOND PAGE    FIRST OBJECT
4. OPERATION REQUEST B    FIRST PAGE     SECOND OBJECT
5. OPERATION REQUEST B    SECOND PAGE    FIRST OBJECT
6. OPERATION REQUEST B    SECOND PAGE    SECOND OBJECT

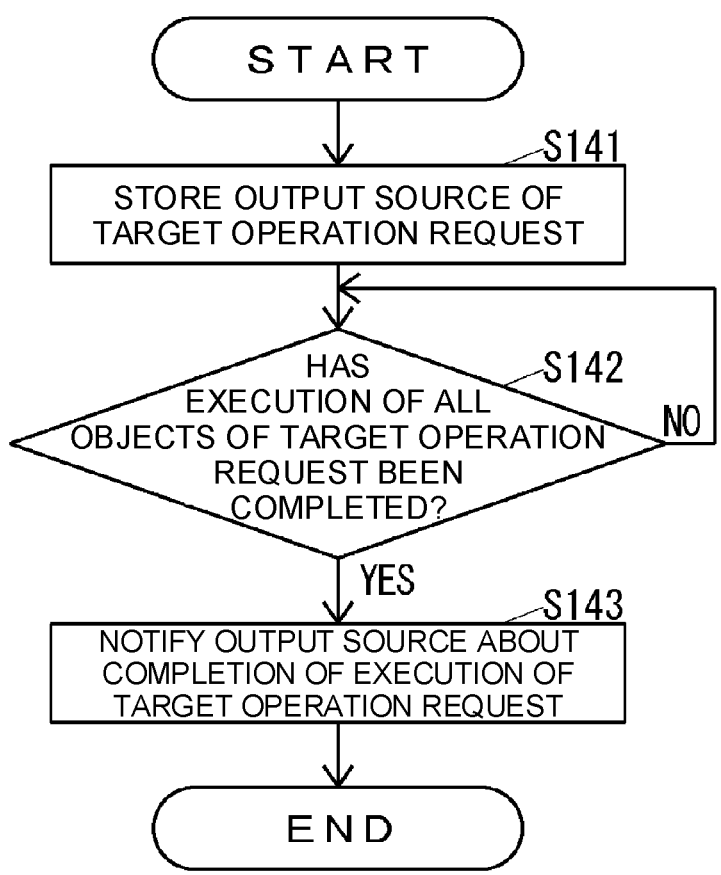

ELECTRONIC DEVICE THAT CONTROLS HARDWARE, AND NON-TRANSITORY COMPUTER-READABLE RECORDING MEDIUM STORING HARDWARE CONTROL PROGRAM FOR ELECTRONIC DEVICE

INCORPORATION BY REFERENCE

This application is based upon, and claims the benefit of priority from, corresponding Japanese Patent Application No. 2019-176654 filed in the Japan Patent Office on Sep. 27, 2019, the entire contents of which are incorporated herein by reference.

BACKGROUND

Field of the Invention

The present disclosure relates to an electronic device that controls hardware and a non-transitory computer-readable recording medium storing a hardware control program.

Description of Related Art

Conventionally known electronic devices include an image forming device including: a device control platform that manages hardware on an operating system; and an application executing unit that executes an application (hereinafter sometimes referred to as "app") using the hardware managed by the device control platform.

SUMMARY

An electronic device according to the present disclosure includes hardware, a hardware operating unit that operates the hardware and a hardware control service that controls the hardware exclusively through an interface provided by the hardware operating unit.

In the electronic device according to the present disclosure, the hardware control service may include a request queuing unit that queues a request for an operation to the hardware, a request executing unit that executes the request queued by the request queuing unit and a completion notifying unit that notifies an output source of the request of completion of execution of the request by the request executing unit.

In the electronic device according to the present disclosure, the hardware control service may include a request queuing unit that queues a request for an operation to the hardware, a request executing unit that executes the request queued by the request queuing unit and an order changing unit that changes an execution order of the request by the request executing unit. The order changing unit may change the execution order of the queued request in accordance with a condition for changing the execution order of the queued request, the condition being indicated by a configuration file, and the configuration file may be changeable.

In the electronic device according to the present disclosure, the hardware may be a processor. The hardware control service may include a request queuing unit that queues a request for an operation to the processor and a request executing unit that executes the request queued by the request queuing unit. The processor may include a memory into which a program to be executed by the processor is loaded. The request executing unit may execute: a program loading step of loading the program corresponding to a type of process executed by the processor from a specific storage area into the memory, a process execution step of causing the processor having the program loaded into the memory at the program loading to execute the process, and a program discarding step of discarding the program loaded into the memory after the process execution, and when the processor continuously executes processes of identical type, the request executing unit may omit the program discarding step for the processes other than the final process among the processes and the program loading step for the processes other than the initial process among the processes.

A non-transitory computer-readable recording medium according to the present disclosure stores a hardware control program. The hardware control program is executed by an electronic device including hardware, and the hardware control program causes the electronic device to implement a hardware operating unit that operates the hardware and a hardware control service that controls the hardware exclusively through an interface provided by the hardware operating unit.

BRIEF DESCRIPTION OF THE DRAWINGS

FIG. 7A is a diagram illustrating an example of a configuration file used by an order changing unit illustrated in FIG. 6;

FIG. 7B is a diagram illustrating an example of a configuration file used by the order changing unit illustrated in FIG. 6, different from the example illustrated in FIG. 7A;

FIG. 8A is a diagram illustrating an example of an operation request execution order changed in accordance with a condition indicated in a configuration file illustrated in FIG. 7A;

FIG. 8B is a diagram illustrating an example of the operation request execution order changed in accordance with a condition indicated in a configuration file illustrated in FIG. 7B;

FIG. 11 is a flowchart of an operation of the AI processor control service illustrated in FIG. 4 in a case where the completion of execution of an operation request is notified to an output source of the operation request.

DETAILED DESCRIPTION

An embodiment of the present disclosure is described below by using the drawings.

A configuration of an image forming device that is an electronic device according to an embodiment of the present disclosure is first described.

Figure 1:
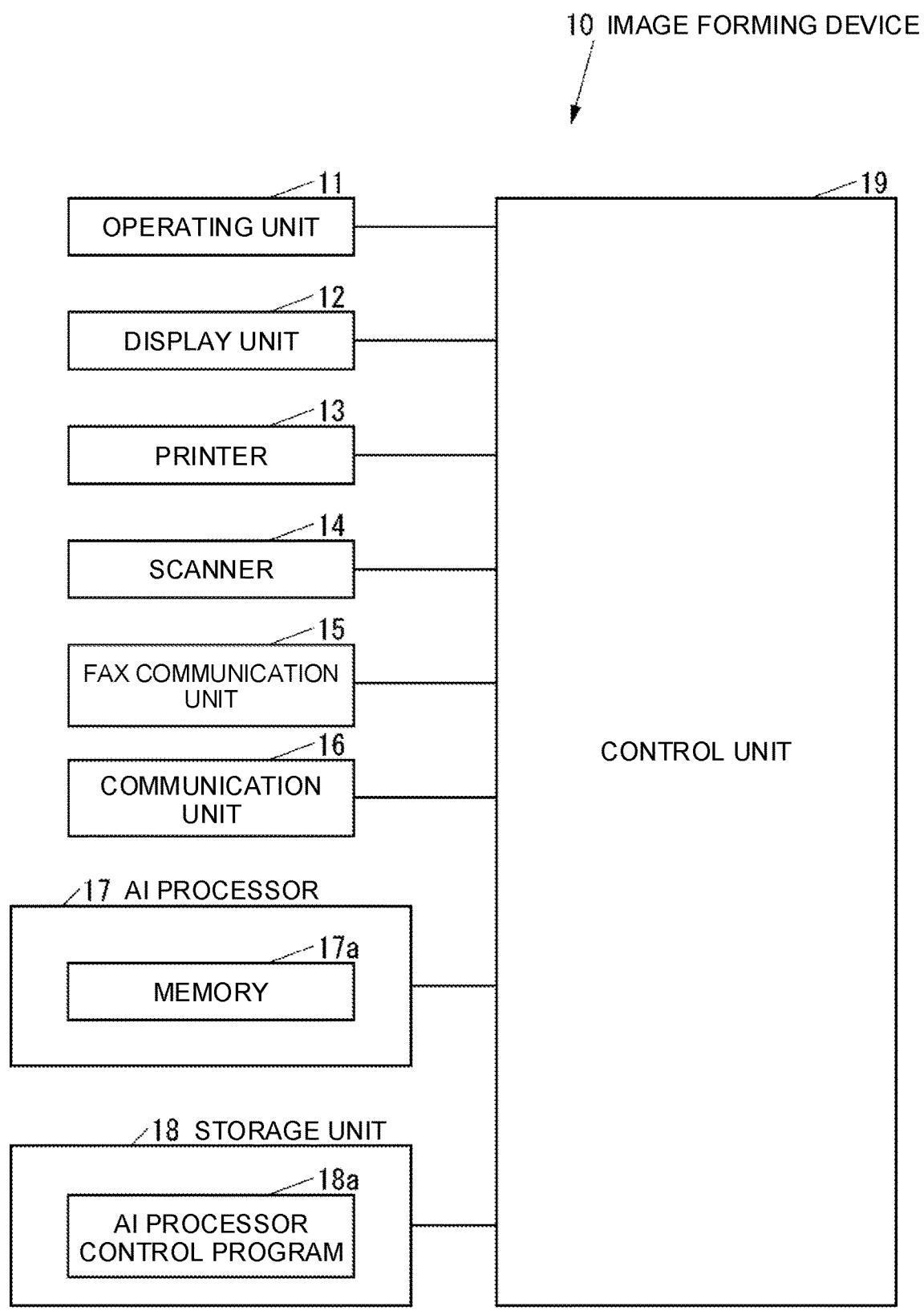
FIG. 1 is a block diagram of an image forming device according to an embodiment of the present disclosure.

FIG. 1 is a block diagram of an image forming device 10 according to the present embodiment.

As illustrated in FIG. 1, the image forming device 10 is a multifunction peripheral (MFP) that includes: an operating unit 11 that is an operation device, such as a button, to which various operations are input; a display unit 12 that is a display device such as an liquid crystal display (LCD) that displays various types of information; a printer 13 that is a printing device that prints an image on a recording medium such as paper; a scanner 14 that is a reading device that reads an image from a document; a fax communication unit 15 that is a fax device that performs fax communications with an external facsimile machine (not illustrated) via a communication line such as a public telephone line; a communication unit 16 that is a communication device that communicates with an external device via a network, such as a local area network (LAN) or the Internet, or directly with a wire or wirelessly without a network; an AI processor 17 that is a processor that enables an inference process of machine learning; and a storage unit 18 that is a nonvolatile storage device, such as a semiconductor memory or an hard disk drive (HDD), which stores various types of information; and a control unit 19 that controls the overall image forming device 10.

The AI processor 17 includes a memory 17a to load the program for commanding the process to be executed by the AI processor 17. When a program is loaded into the memory 17a, the AI processor 17 executes the process commanded by the program.

The storage unit 18 may store an AI processor control program 18a that is a hardware control program for controlling the AI processor 17. For example, the AI processor control program 18a may be installed in the image forming device 10 at the manufacturing stage of the image forming device 10, may be additionally installed in the image forming device 10 from an external storage medium such as a USB (Universal Serial Bus) memory or an SD card, or may be additionally installed in the image forming device 10 via a network.

The control unit 19 includes, for example, a central processing unit (CPU), a read only memory (ROM) that stores a program and various types of data, and a random access memory (RAM) that is a memory used as a work area for the CPU of the control unit 19. The CPU of the control unit 19 executes a program stored in the storage unit 18 or the ROM of the control unit 19.

Figure 2:
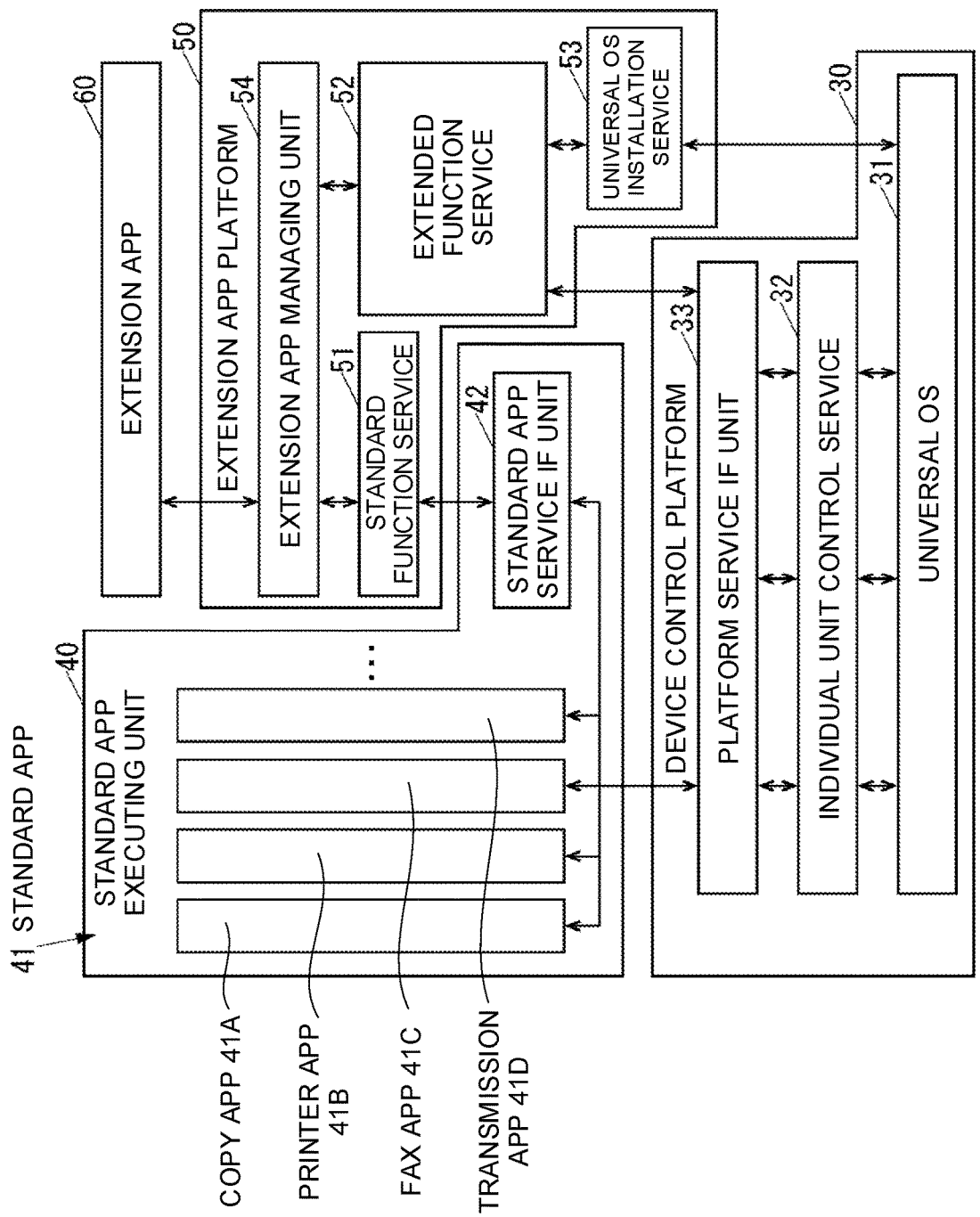
FIG. 2 is a block diagram illustrating a control configuration of the image forming device illustrated in FIG. 1.

FIG. 2 is a block diagram illustrating a control configuration of the image forming device 10.

The control unit 19 executes a program stored in the storage unit 18 or the ROM of the control unit 19 to implement the control configuration illustrated in FIG. 2.

As illustrated in FIG. 2, the control configuration of the image forming device 10 includes, for example, a device control platform 30 that manages the hardware of each unit of the image forming device 10, such as the operating unit 11, the display unit 12, the printer 13, the scanner 14, the fax communication unit 15, or the communication unit 16, and controls the hardware on a function-by-function basis; a standard app executing unit 40 that executes a standard app 41 that is an application program for executing various standard processes of the image forming device 10; and an extension app platform 50 that executes an extension app 60 that is an application program for executing various processes that are not executable with only the standard app 41.

The standard app executing unit 40 and the extension app platform 50 each operate on the device control platform 30.

The device control platform 30 includes, for example, a universal operating system (OS) 31 such as Linux (registered trademark); an individual unit control service 32 that controls the hardware of an individual unit of the image forming device 10 corresponding to a function of the image forming device 10 in an appropriate manner; and a platform service IF unit 33 that provides the interface for using the hardware from outside the device control platform 30.

The standard app executing unit 40 includes the standard app 41 and a standard app service IF unit 42 that provides the interface for using a function of the standard app 41 from outside the standard app executing unit 40.

Examples of the standard app 41 include: a copy app 41A that uses the printer 13 to print an image read from a document by the scanner 14 in response to a command via the operating unit 11; a printer app 41B that uses the printer 13 to execute printing based on data input via the communication unit 16 or data stored in the storage unit 18; a fax app 41C that uses the fax communication unit 15 to execute facsimile transmission of an image read from a document by the scanner 14 in accordance with a command via the operating unit 11 or an image based on data input via the communication unit 16, uses the printer 13 to print the image received due to the facsimile by the fax communication unit 15, or store the image in the storage unit 18; and a transmission app 41D that transmits data via the communication unit 16.

The standard app service IF unit 42 may provide a different interface for each of the standard apps 41. The standard app service IF unit 42 may for example execute, install, change the settings of, or delete the standard app 41.

The extension app platform 50 includes: a standard function service 51 that causes the standard app 41 to execute a function via the standard app service IF unit 42; an extended function service 52 to cause the hardware of each unit of the image forming device 10 to execute a function via the platform service IF unit 33; a universal OS installation service 53 that adds a function to the universal OS 31; and an extension app managing unit 54 that uses an API of the extension app platform 50 to manage the installation, activation, execution, termination of the execution, uninstallation, and the like, of the extension app 60.

The extension app 60 may invoke the standard function service 51 to use a function of the standard app 41, invoke the extended function service 52 to use a function of the hardware of each unit of the image forming device 10, and invoke the universal OS installation service 53 to add a function to the universal OS 31. Examples of the extension app 60 include practical apps, such as optical character recognition (OCR), monitoring camera app, watermark generation, billing generation, employee list management, expense sheet management, contract management, business card management, PDF generation, account management, or group management, and management apps, such as an installer app for making additional changes in a device driver, firmware, or the like, of the universal OS 31.

Figure 3:
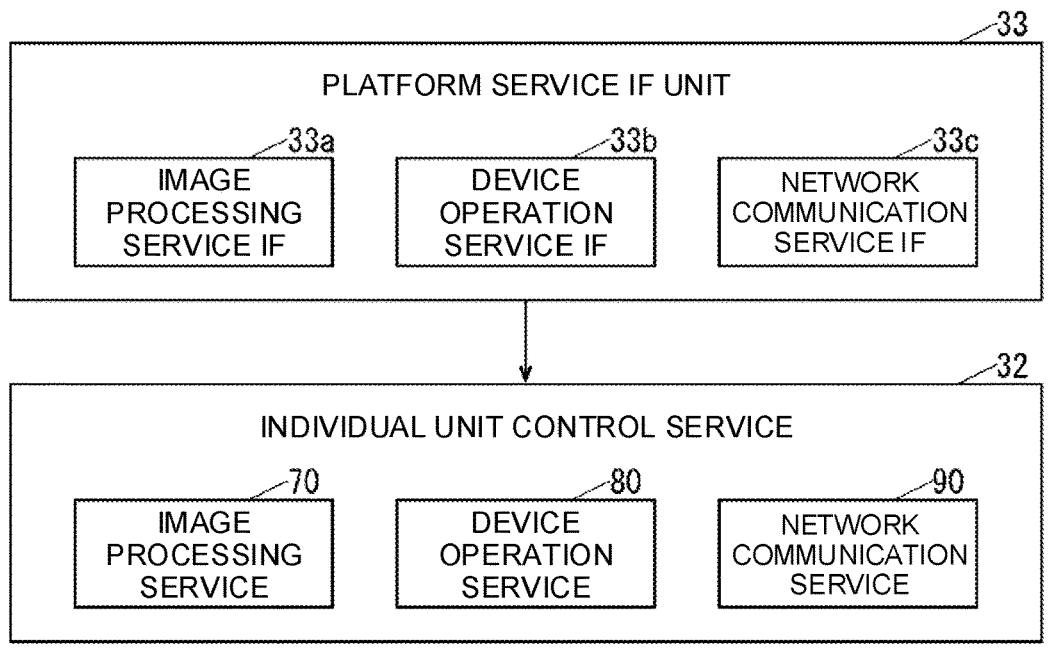
FIG. 3 is a block diagram illustrating a detailed configuration of an individual unit control service and a platform service IF unit illustrated in FIG. 2.

FIG. 3 is a block diagram illustrating the detailed configuration of the individual unit control service 32 and the platform service IF unit 33.

As illustrated in FIG. 3, the individual unit control service 32 includes: an image processing service 70 that provides a service regarding the generation, conversion, or output of image processing data, e.g., drawing of the image data to be printed by the printer 13; a device operation service 80 that provides a service to control the hardware of each unit, i.e., the device, of the image forming device 10; and a network communication service 90 that provides a service regarding the transmission/reception via a network.

The platform service IF unit 33 includes: an image processing service IF 33a that is an interface corresponding to a function of the device control platform 30 regarding the generation, conversion, or output of image processing data; a device operation service IF 33b that is an interface corresponding to a function of the device control platform 30 to control a device of the image forming device 10; and a network communication service IF 33c that is an interface corresponding to a function of the device control platform 30 regarding the transmission/reception via a network.

The image processing service IF 33a, the device operation service IF 33b, and the network communication service IF 33c of the platform service IF unit 33 are configured to invoke the image processing service 70, the device operation service 80, and the network communication service 90 of the individual unit control service 32 independently without cooperation. For example, for a job of the copy app 41A, the image processing service IF 33a invokes the image processing service 70 and the device operation service 80. Therefore, when any of the functions of the standard app 41 has changed, only the one that is related to the function among the image processing service IF 33a, the device operation service IF 33b, and the network communication service IF 33c may be changed so as to handle it.

Figure 4:
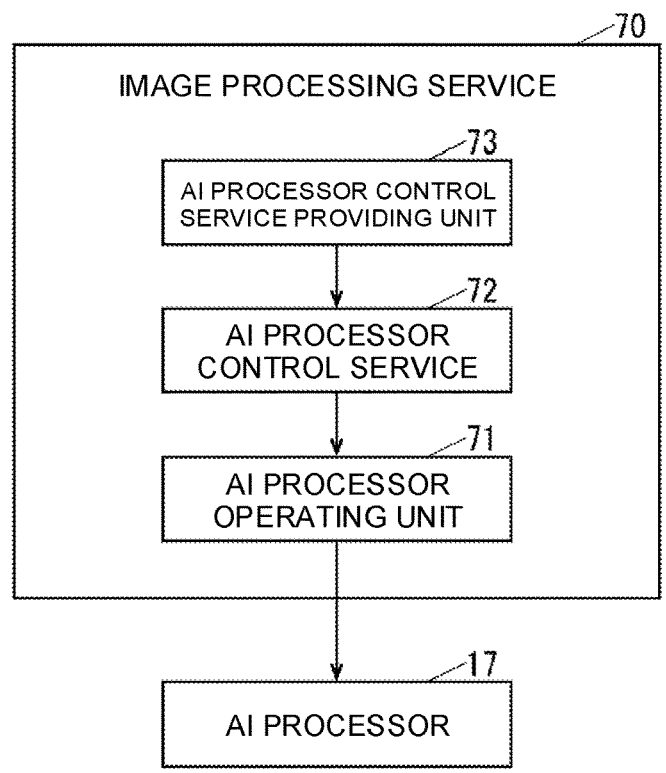
FIG. 4 is a block diagram illustrating a detailed configuration of an image processing service illustrated in FIG. 3.

FIG. 4 is a block diagram illustrating the detailed configuration of the image processing service 70.

As illustrated in FIG. 4, the image processing service 70 includes: an AI processor operating unit 71 that is a hardware operating unit that is the driver operating the AI processor 17 which is hardware; an AI processor control service 72 that is a hardware control service that controls the AI processor 17 via the AI processor operating unit 71; and an AI processor control service providing unit 73 that is an interface to invoke the AI processor control service 72 from outside the image processing service 70. The AI processor control service 72 may control the AI processor 17 exclusively via an interface provided by the AI processor operating unit 71.

The control unit 19 executes the AI processor control program 18a to implement the AI processor operating unit 71, the AI processor control service 72, and the AI processor control service providing unit 73.

The image processing service 70 may use the AI processor 17 to, for example, execute AI processing on an image read by the scanner 14. For example, the image processing service 70 may make a blurry line clear by AI processing in the case of image enlargement and may extract a handwritten character contained in an image by AI processing.

Figure 5:
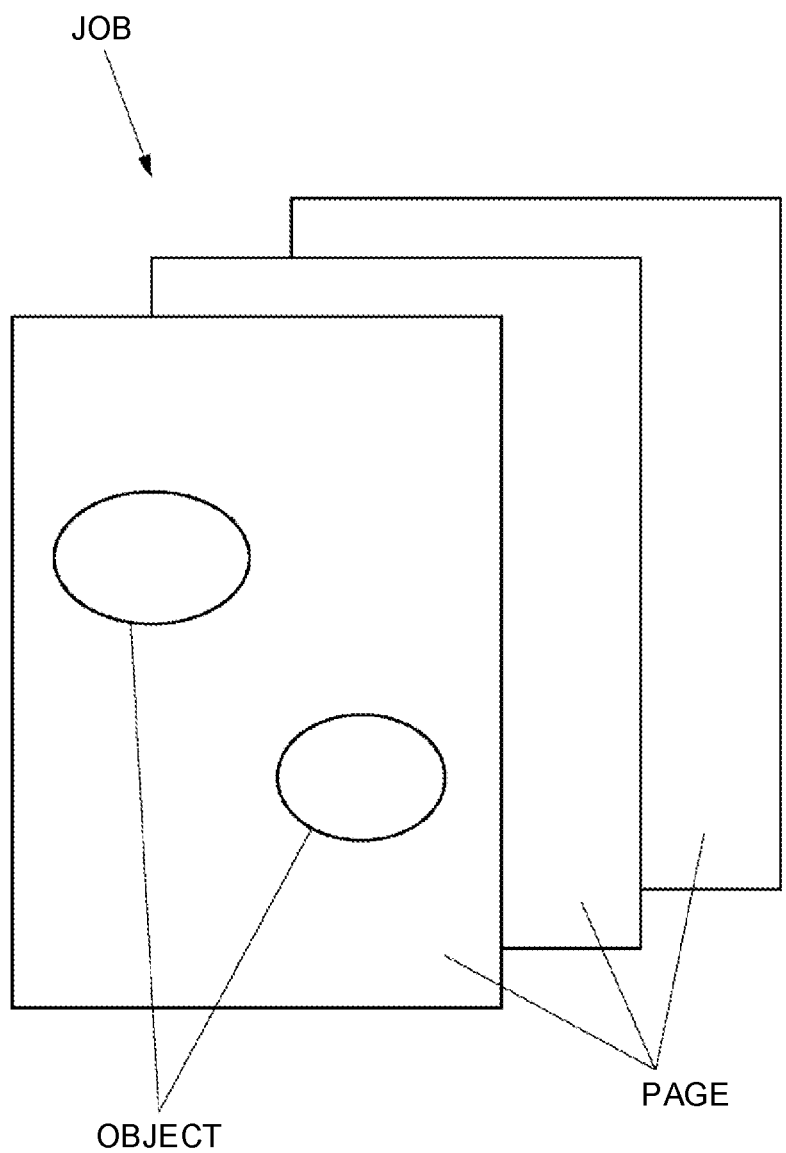
FIG. 5 is a diagram illustrating an example of a request for an operation to an artificial intelligence (AI) processor illustrated in FIG. 1.

FIG. 5 is a diagram illustrating an example of a request for an operation (hereinafter referred to as an "operation request") to the AI processor 17.

An operation request is input from the copy app 41A or the printer app 41B to the AI processor control service providing unit 73 via the platform service IF unit 33. Multiple operation requests are sometimes simultaneously input to the AI processor control service providing unit 73. As illustrated in FIG. 5, an operation request is in units called jobs. A job is made up of at least one page that is a smaller unit than a job. A page is made up of at least one object that is a smaller unit than a page. A page represents the unit of one sheet of document read by the scanner 14 when the job is a job of the copy app 41A, and a page represents the unit of one sheet printed by the printer 13 when the job is a job of the printer app 41B. An object represents one unit of processing performed by the AI processor 17.

Figure 6:
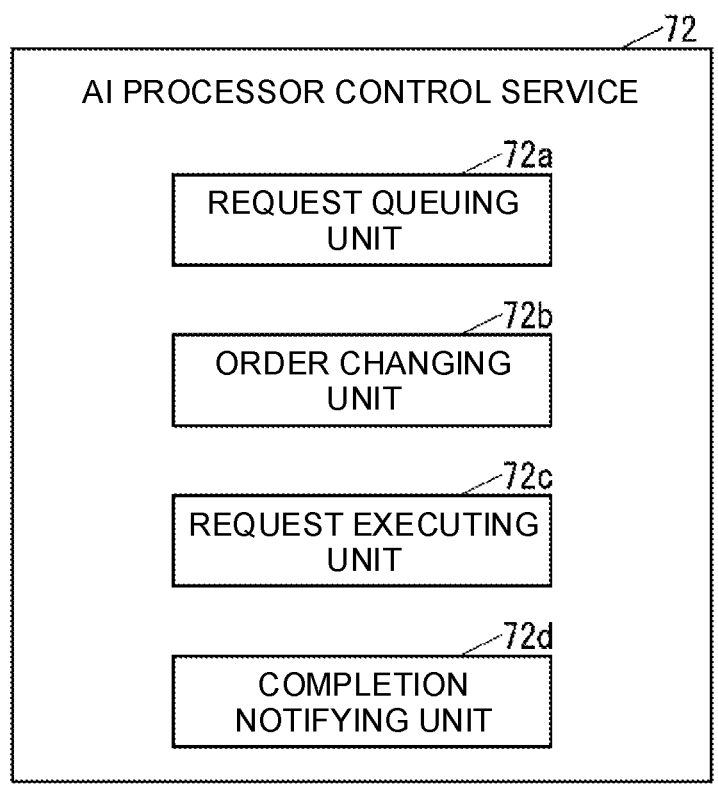
FIG. 6 is a block diagram illustrating a detailed configuration of an AI processor control service illustrated in FIG. 4.

FIG. 6 is a block diagram illustrating the detailed configuration of the AI processor control service 72.

As illustrated in FIG. 6, the AI processor control service 72 includes: a request queuing unit 72a that queues an operation request; an order changing unit 72b that changes the execution order of operation requests; a request executing unit 72c that executes the operation request queued by the request queuing unit 72a; and a completion notifying unit 72d that notifies the output source of the operation request of the completion of execution of the operation request by the request executing unit 72c.

Next, an operation of the image forming device 10 is described.

First, the operation of the AI processor control service 72 in the case of queuing an operation request is described.

When an operation request is input to the AI processor control service providing unit 73, the request queuing unit 72a of the AI processor control service 72 queues the operation request input to the AI processor control service providing unit 73. Specifically, the request queuing unit 72a stores the execution order of operation requests input to the AI processor control service providing unit 73 in a queue in the RAM of the control unit 19.

Next, the operation of the AI processor control service 72 to change the execution order of a queued operation request is described.

The order changing unit 72b of the AI processor control service 72 reads a configuration file indicating the condition for changing the execution order of a queued operation request from, for example, a specific storage area of a recording medium outside the image forming device 10 and loads the configuration file into the RAM of the control unit 19. The timing in which the order changing unit 72b loads the configuration file into the RAM is a specific timing such as the timing in which the configuration file is written in the specific storage area, the timing in which the command for changing the configuration file is input via the operating unit 11 or the communication unit 16, or the timing in which the image forming device 10 is started up. The configuration file is a file indicating the unit for switching the execution by the AI processor 17 for each type of process executed by the AI processor 17 and may be changed.

FIG. 7A is a diagram illustrating an example of the configuration file used by the order changing unit 72b. FIG. 7B is a diagram illustrating an example of the configuration file used by the order changing unit 72b, different from the example illustrated in FIG. 7A.

In the configuration file illustrated in FIG. 7A, the switching unit for the process whose type is "process A" among the processes executed by the AI processor 17 is "object", and the switching unit for the process whose type is "process B" among the processes executed by the AI processor 17 is "page". In the configuration file illustrated in FIG. 7B, the switching unit for the process whose type is "process A" among the processes executed by the AI processor 17 is "object", and the switching unit for the process whose type is "process B" among the processes executed by the AI processor 17 is also "object". Here, the switching unit may be set to any of "job", "page", and "object".

As a specific example, changing the order of execution is described in the case of queuing an operation request A whose type of process, number of pages, and number of objects per page are "process A", 2, and 1, respectively, and an operation request B whose type of process, number of pages, and number of objects per page are "process B", 2, and 2, respectively. The operation request A is executed earlier in the order than the operation request B.

FIG. 8A is a diagram illustrating an example of the operation request execution order changed in accordance with the condition indicated in the configuration file illustrated in FIG. 7A. FIG. 8B is a diagram illustrating an example of the operation request execution order changed in accordance with the condition indicated in the configuration file illustrated in FIG. 7B.

As illustrated in FIG. 8A, when the configuration file illustrated in FIG. 7A is used, the order changing unit 72b places a first object of a first page of the operation request A whose process type is "process A" as the first in the execution order as the switching unit for the process whose type is "process A" is "object" and then the switches the subsequent execution target to the operation request B. Then, as the switching unit for the process whose type is "process B" is "page", the order changing unit 72b places a first object and a second object of a first page of the operation request B whose process type is "process B" as the second and the third in the execution order and then switches the subsequent execution target to the operation request A. Then, as the switching unit for the process whose type is "process A" is "object", the order changing unit 72b places a first object of a second page of the operation request A whose process type is "process A" as the fourth in the execution order and then switches the subsequent execution target to the operation request B. Then, as the switching unit for the process whose type is "process B" is "page", the order changing unit 72b places a first object and a second object of a second page of the operation request B whose process type is "process B" as the fifth and the sixth in the execution order.

As illustrated in FIG. 8B, when the configuration file illustrated in FIG. 7B is used, the order changing unit 72b places the first object of the first page of the operation request A whose process type is "process A" as the first in the execution order as the switching unit for the process whose type is "process A" is "object" and then switches the subsequent execution target to the operation request B. Then, as the switching unit for the process whose type is "process B" is "object", the order changing unit 72b places the first object of the first page of the operation request B whose process type is "process B" as the second in the execution order and then switches the subsequent execution target to the operation request A. Then, as the switching unit for the process whose type is "process A" is "object", the order changing unit 72b places the first object of the second page of the operation request A whose process type is "process A" as the third in the execution order and then switches the subsequent execution target to the operation request B. Then, although the switching unit for the process whose type is "process B" is "object", as the execution order of all the objects of the operation request A have been completely determined, the order changing unit 72b places the second object of the first page and the first object and the second object of the second page of the operation request B whose process type is "process B" as the fourth, the fifth, and the sixth in the execution order.

Next, an operation of the AI processor control service 72 in the case of execution of a queued operation request is described.

Figure 9:
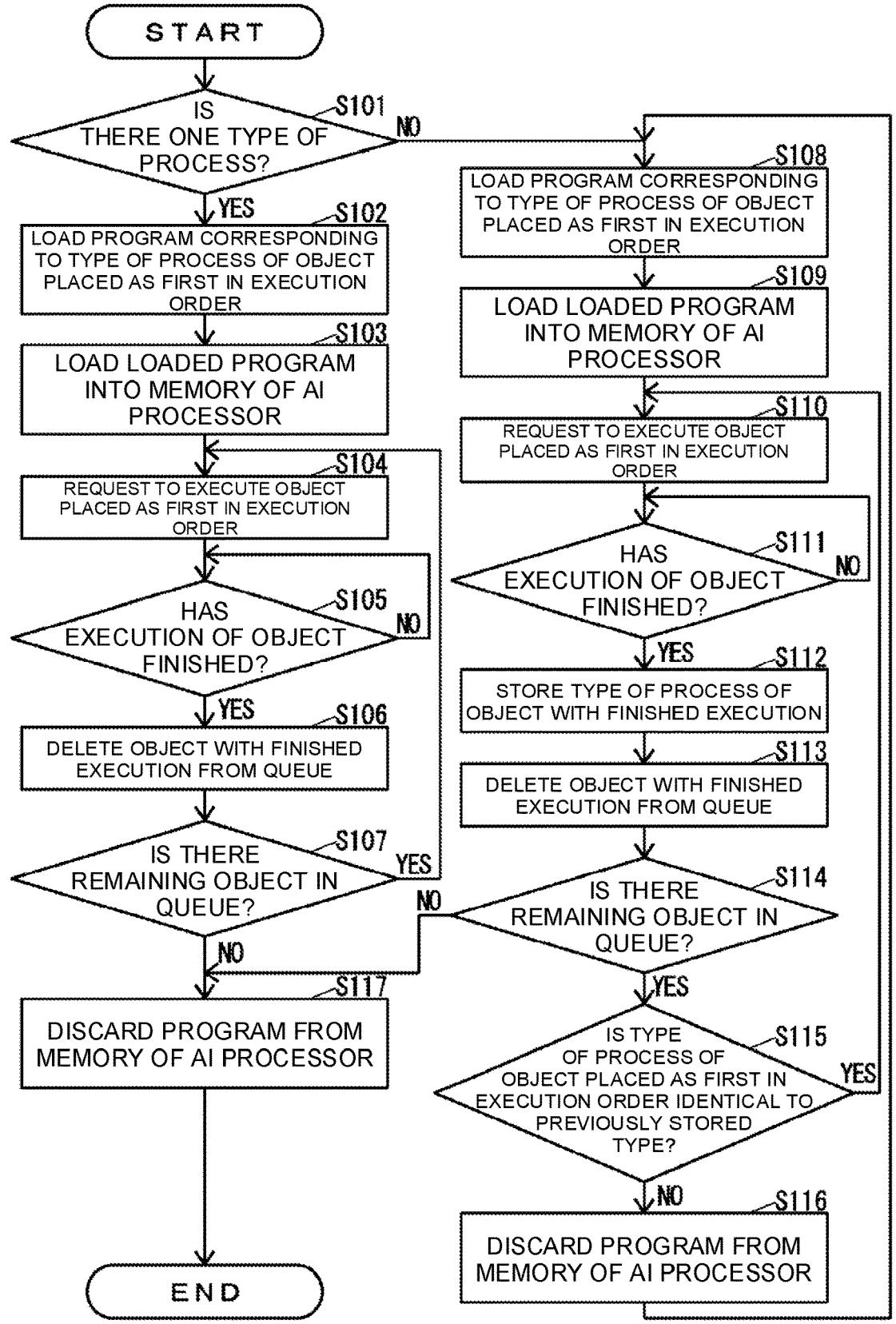
FIG. 9 is a flowchart of an operation of the AI processor control service illustrated in FIG. 4 in the case of execution of a queued operation request.

FIG. 9 is a flowchart of an operation of the AI processor control service 72 in the case of execution of a queued operation request.

The AI processor control service 72 executes the operation illustrated in FIG. 9 when an object is queued.

As illustrated in FIG. 9, the request executing unit 72c of the AI processor control service 72 determines whether there is one type of process of an object present in the queue (S101).

When it is determined at S101 that there is one type of process of an object present in the queue, the request executing unit 72c loads the program corresponding to the type of process of the object placed as the first in the execution order of the queue from, for example, a specific storage area of a storage medium outside the image forming device 10 (S102). A program is present for each type of process of an object.

Then, the request executing unit 72c loads the program loaded at S102 into the memory 17a of the AI processor 17 (S103). The steps at S102 and S103 form a program loading step according to the present disclosure.

Subsequently, the request executing unit 72c requests that the AI processor operating unit 71 execute the object placed as the first in the execution order of the queue (S104). The step at S104 forms a process execution step according to the present disclosure.

Subsequently, the request executing unit 72c determines whether the execution of the object requested at S104 has finished until it is determined that the execution of the object requested at S104 has finished (S105).

When it is determined at S105 that the execution of the object requested at S104 has finished, the request executing unit 72c deletes the object from the queue (S106). Therefore, when there is a remaining object in the queue, the execution order in the queue is raised by one.

After the process at S106, the request executing unit 72c determines whether there is a remaining object in the queue (S107).

When it is determined at S107 that there is a remaining object in the queue, the request executing unit 72c executes the process at S104.

When it is determined at S101 that there is not one type of process of an object present in the queue, the request executing unit 72c loads the program corresponding to the type of process of the object placed as the first in the execution order of the queue from, for example, a specific storage area of a storage medium outside the image forming device 10 (S108).

Then, the request executing unit 72c loads the program loaded at S108 into the memory 17a of the AI processor 17 (S109). The steps at S108 and S109 form a program loading process according to the present disclosure.

Subsequently, the request executing unit 72c requests that the AI processor operating unit 71 execute the object placed as the first in the execution order of the queue (S110). The step at S110 forms a process execution step according to the present disclosure.

Then, the request executing unit 72c determines whether the execution of the object requested at S110 has finished until it is determined that the execution of the object requested at S110 has finished (S111).

When it is determined at S111 that the execution of the object requested at S110 has finished, the request executing unit 72c stores the type of process of the object (S112).

Then, the request executing unit 72c deletes the object placed as the first in the execution order of the queue from the queue (S113). Therefore, when there is a remaining object in the queue, the execution order in the queue is raised by one.

After the process at S113, the request executing unit 72c determines whether there is a remaining object in the queue (S114).

When it is determined at S114 that there is a remaining object in the queue, the request executing unit 72c determines whether the type of process of the object placed as the first in the execution order of the queue is identical to the type previously stored at S112 (S115).

When it is determined at S115 that the type of process of the object placed as the first in the execution order of the queue is identical to the type previously stored at S112, the request executing unit 72c executes the process at S110.

When it is determined at S115 that the type of process of the object placed as the first in the execution order of the queue is not identical to the type previously stored at S112, the request executing unit 72c discards, from the memory 17a, the program loaded into the memory 17a of the AI processor 17 (S116) and executes the process at S108. The step at S116 forms a program discarding step according to the present disclosure.

When it is determined at S107 or S114 that there is no remaining object in the queue, the request executing unit 72c discards, from the memory 17a, the program loaded into the memory 17a of the AI processor 17 (S117) and ends the operation illustrated in FIG. 9. The step at S117 forms a program discarding step according to the present disclosure.

Figure 10:
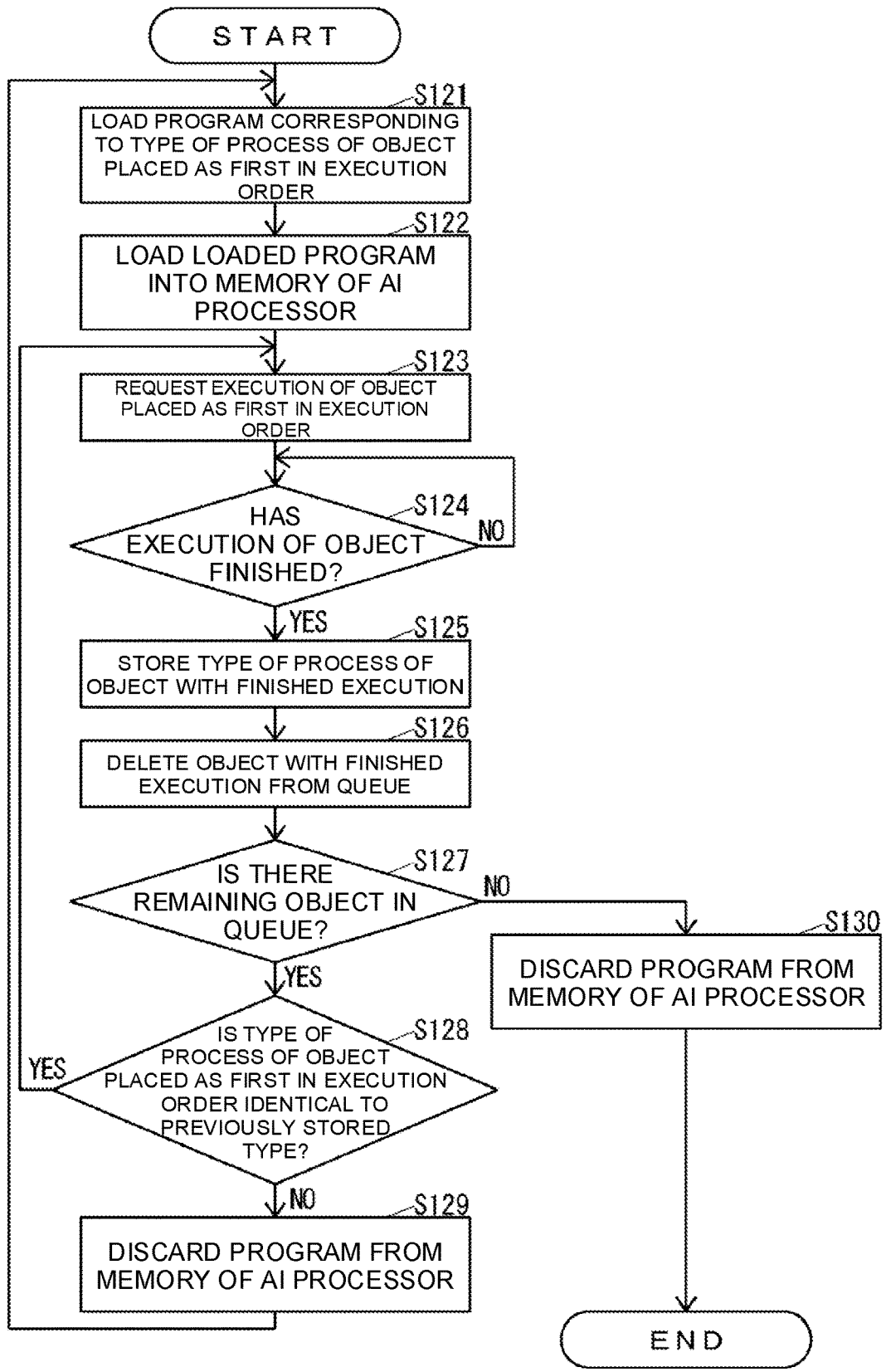
FIG. 10 is a flowchart of an example, different from FIG. 9, of the operation of the AI processor control service illustrated in FIG. 4 in the case of execution of a queued operation request.

FIG. 10 is a flowchart of an example, different from FIG. 9, of the operation of the AI processor control service 72 in the case of execution of a queued operation request.

The AI processor control service 72 may execute the operation illustrated in FIG. 10 instead of the operation illustrated in FIG. 9.

As illustrated in FIG. 10, the request executing unit 72c of the AI processor control service 72 loads the program corresponding to the type of process of the object placed as the first in the execution order of the queue from, for example, a specific storage area of a storage medium outside the image forming device 10 (S121).

Then, the request executing unit 72c loads the program loaded at S121 into the memory 17a of the AI processor 17 (S122). The steps at S121 and S122 form a program loading step according to the present disclosure.

Subsequently, the request executing unit 72c requests the AI processor operating unit 71 to execute the object placed as the first in the execution order of the queue (S123). The step at S123 forms a process execution step according to the present disclosure.

Subsequently, the request executing unit 72c determines whether the execution of the object requested at S123 has finished until it is determined that the execution of the object requested at S123 has finished (S124).

When it is determined at S124 that the execution of the object requested at S123 has finished, the request executing unit 72c stores the type of process of the object (S125).

Then, the request executing unit 72c deletes, from the queue, the object placed as the first in the execution order of the queue (S126). Therefore, when there is a remaining object in the queue, the execution order in the queue is raised by one.

After the process at S126, the request executing unit 72c determines whether there is a remaining object in the queue (S127).

When it is determined at S127 that there is a remaining object in the queue, the request executing unit 72c determines whether the type of process of the object placed as the first in the execution order of the queue is identical to the type previously stored at S125 (S128).

When it is determined at S128 that the type of process of the object placed as the first in the execution order of the queue is identical to the type previously stored at S125, the request executing unit 72c executes the process at S123.

When it is determined at S128 that the type of process of the object placed as the first in the execution order of the queue is not identical to the type previously stored at S125, the request executing unit 72c discards, from the memory 17a, the program loaded into the memory 17a of the AI processor 17 (S129) and executes the process at S121. The step at S129 forms a program discarding step according to the present disclosure.

When it is determined at S127 that there is no remaining object in the queue, the request executing unit 72c discards, from the memory 17a, the program loaded into the memory 17a of the AI processor 17 (S130) and ends the operation illustrated in FIG. 10. The step at S130 forms a program discarding step according to the present disclosure.

Next, an operation of the AI processor control service 72 in a case where the completion of execution of an operation request is notified to the output source of the operation request is described.

FIG. 11 is a flowchart of an operation of the AI processor control service 72 in a case where the completion of execution of an operation request is notified to the output source of the operation request.

Each time an operation request is queued, the AI processor control service 72 executes the operation illustrated in FIG. 11 for the operation request.

As illustrated in FIG. 11, the completion notifying unit 72d of the AI processor control service 72 stores the output source of the target operation request (S141). The output source is, for example, the copy app 41A or the printer app 41B.

After the process at S141, the completion notifying unit 72d determines whether the execution of all the objects of the target operation request has been completed until it is determined that the execution of all the objects of the target operation request has been completed (S142).

When it is determined at S142 that the execution of all the objects of the target operation request has been completed, the completion notifying unit 72d notifies the output source stored at S141 of the execution of the target operation request (S143) and ends the operation illustrated in FIG. 11.

As described above, in the image forming device 10, when the AI processor 17 has changed, the interface provided by the AI processor operating unit 71 to the AI processor control service 72 is not changed and only the AI processor operating unit 71 is changed in response to the change in the AI processor 17 so that the AI processor control service 72 and the AI processor control service providing unit 73 do not need to be changed, whereby it is possible to localize software changes in response to a change in the AI processor 17, e.g., the AI processor 17 is changed to a different AI processor.

The image forming device 10 queues an operation request to the AI processor 17, executes a queued operation request (S104, S110, or S123), and notifies the output source of the operation request of the completion of execution of the operation request (S143), whereby it is possible to cause the output source of the operation request to execute a different process before the execution of the operation request is completed. Thus, the image forming device 10 may prevent the occurrence of the situation in which the output source of the operation request falls into the waiting state due to an unexecuted operation request and, as a result, may improve the execution efficiency of the output source.

In the image forming device 10, as the configuration file is changed to alter the condition for changing the execution order of operation requests, the program of the AI processor control service 72, i.e., the AI processor control program 18a, does not need to be changed to alter the condition for changing the execution order of operation requests, whereby it is possible to easily alter the condition for changing the execution order of operation requests.

In the image forming device 10, when multiple processes of the identical type are continuously executed by the AI processor 17 (YES at S101, YES at S115, or YES at S128), the program discarding step is omitted for the process except for the final process among the processes and the program loading step is omitted for the process except for the initial process among the processes, whereby the process execution efficiency may be improved.

According to the present embodiment, an operation request to the AI processor 17 is input from the copy app 41A or the printer app 41B to the AI processor control service providing unit 73 via the platform service IF unit 33. An operation request to the AI processor 17 may be input to the AI processor control service providing unit 73 from an application program other than the copy app 41A and the printer app 41B via the platform service IF unit 33. For example, an operation request to the AI processor 17 may be input to the AI processor control service providing unit 73 from the fax app 41C via the platform service IF unit 33.

According to the present embodiment, the AI processor is used in the image processing service 70. The AI processor may be used in a service other than the image processing service 70. For example, the AI processor may be used in the device operation service 80 or the network communication service 90.

Although the hardware according to the present disclosure is an AI processor in the present embodiment, a processor other than an AI processor may be used, or hardware other than a processor may be used.

Although the electronic device according to the present disclosure is an MFP in the present embodiment, the electronic device may be an image forming device other than an MFP, such as a dedicated printer machine, a dedicated scanner machine, a dedicated fax machine, or a copy machine, or may be an electronic device other than an image forming device, such as a personal computer (PC).

What is claimed is:

1. An electronic device comprising:
   hardware;
   a hardware operating unit that operates the hardware; and
   a hardware control service that controls the hardware exclusively through an interface provided by the hardware operating unit,
   wherein
   the hardware is a processor,
   the hardware control service includes:
      a request queuing unit that queues a request for an operation to the processor; and
      a request executing unit that executes the request queued by the request queuing unit,
   the processor includes a memory into which a program to be executed by the processor is loaded,
   the request executing unit executes:
      a program loading step of loading the program corresponding to a type of process executed by the processor from a specific storage area into the memory,
      a process execution step of causing the processor having loaded the program into the memory to execute the process, and
      a program discarding step of discarding the program loaded into the memory after the process execution step, and
   when the processor continuously executes processes of identical type, the request executing unit omits the program discarding step for the processes other than a final process among the processes, and the program loading step for the processes other than an initial process among the processes.

2. The electronic device according to claim 1, wherein the hardware control service includes:
   a request queuing unit that queues a request for an operation to the hardware;
   a request executing unit that executes the request queued by the request queuing unit; and
   an order changing unit that changes an execution order of the request by the request executing unit,
   the order changing unit changes the execution order of the queued request in accordance with a condition for changing the execution order of the queued request, the condition being indicated by a configuration file, and
   the configuration file is changeable.

3. The electronic device according to claim 1, wherein the hardware control service includes:
   a request queuing unit that queues a request for an operation to the hardware;
   a request executing unit that executes the request queued by the request queuing unit; and
   a completion notifying unit that notifies an output source of the request of completion of execution of the request by the request executing unit.

4. A non-transitory computer-readable recording medium storing a hardware control program executed by an electronic device, including hardware, wherein the hardware control program causes the electronic device to implement
   a hardware operating unit that operates the hardware, and
   a hardware control service that controls the hardware exclusively through an interface provided by the hardware operating unit,
   wherein
   the hardware is a processor,
   the hardware control service includes:
      a request queuing unit that queues a request for an operation to the processor; and
      a request executing unit that executes the request queued by the request queuing unit,
   the processor includes a memory into which a program to be executed by the processor is loaded,
   the request executing unit executes:
      a program loading step of loading the program corresponding to a type of process executed by the processor from a specific storage area into the memory,
      a process execution step of causing the processor having loaded the program into the memory to execute the process, and
      a program discarding step of discarding the program loaded into the memory after the process execution step, and
   when the processor continuously executes processes of identical type, the request executing unit omits the program discarding step for the processes other than a final process among the processes, and the program loading step for the processes other than an initial process among the processes.

\* \* \* \* \*